(12) United States Patent
Wiatrowski et al.

(10) Patent No.: US 8,259,690 B2
(45) Date of Patent: Sep. 4, 2012

(54) SYSTEM AND METHOD FOR PAUSING AN ONGOING TRANSMISSION IN A COMMUNICATION SYSTEM

(75) Inventors: David G. Wiatrowski, Woodstock, IL (US); John P. Belmonte, Schaumburg, IL (US); Dipendra M. Chowdhary, Hoffman Estates, IL (US); Kevin M. Ittner, Chicago, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 978 days.

(21) Appl. No.: 11/753,004

(22) Filed: May 24, 2007

(65) Prior Publication Data

US 2008/0291853 A1 Nov. 27, 2008

(51) Int. Cl.
*H04B 7/212* (2006.01)
(52) U.S. Cl. ..... 370/337; 370/329; 370/336; 455/452.1; 455/509; 455/515; 455/516; 455/527
(58) Field of Classification Search ................. 370/337, 370/321, 336, 347, 341, 348, 329; 455/507–511, 455/515–522, 527, 418–419, 450–452.1
See application file for complete search history.

(56) References Cited

U.S. PATENT DOCUMENTS

| | | | | |
|---|---|---|---|---|
| 5,463,617 A | | 10/1995 | Grube | |
| 5,568,511 A | * | 10/1996 | Lampe | 370/341 |
| 6,889,048 B1 | * | 5/2005 | Koo | 455/452.1 |
| 6,961,595 B2 | * | 11/2005 | Laroia et al. | 455/574 |
| 2003/0050083 A1 | * | 3/2003 | Metais et al. | 455/509 |
| 2003/0125023 A1 | * | 7/2003 | Fishler | 455/426 |
| 2004/0085940 A1 | | 5/2004 | Black et al. | |
| 2005/0201352 A1 | | 9/2005 | Biggs | |
| 2006/0031515 A1 | * | 2/2006 | Van Gassel et al. | 709/227 |
| 2007/0206533 A1 | | 9/2007 | Wiatrowski | |

FOREIGN PATENT DOCUMENTS

RU 2283538 C2 9/2006

OTHER PUBLICATIONS

ETSI TS 102 361-1 V1.2.1 Electromagnetic compatibility and Radio spectrum Matters (ERM); Digital Mobile Radio (DMR) Systems; Part 1: DMR Air Interface (AI) protocol (Jan. 2006).*
PCT Search Report Dated Sep. 12, 2008.

(Continued)

*Primary Examiner* — Marcos Torres
(74) *Attorney, Agent, or Firm* — Terri Hughes Smith; Valerie M. Davis; Kenneth A. Haas (57) ABSTRACT

A system and method for pausing communications from a transmitting radio for a certain period of time in order to allow transmission of other messages. When a first radio determines that a message needs to be transmitted either to a second radio or the transmitting radio, the first radio determines whether there are any available forward channels to transmit the call. If no forward channel is available, the first radio determines a period of time required to transmit the message and sends, on a reverse channel, a "request to pause" signal to the transmitting radio identifying that period of time. Upon receiving the "request to pause" signal, the transmitting radio ceases transmission on the forward channel for the specified period of time, during which time the first radio transmits the message.

20 Claims, 5 Drawing Sheets

OTHER PUBLICATIONS

International Preliminary Report on Patentability mailed on Dec. 3, 2009 for International Application No. PCT/US2008/062852.

UK Office Action mailed on Jul. 19, 2011 for Application No. GB0921824.9.

English Translation of Russian Office Action mailed on Dec. 14, 2010 for Application No. 2009148044.

English Translation of Russian Notice of Allowance mailed on Aug. 3, 2011 for Application No. 2009148044.

* cited by examiner

SYSTEM AND METHOD FOR PAUSING AN ONGOING TRANSMISSION IN A COMMUNICATION SYSTEM

TECHNICAL FIELD OF THE DISCLOSURE

This disclosure relates generally to communication systems, and more particularly, to a system and method for pausing an ongoing transmission in a communication system.

BACKGROUND OF THE DISCLOSURE

Wireless communication systems generally comprise a set of radios and a set of base stations. The radios, which may be mobile radios, portable radios or the like, are generally the endpoints of a communication path, while base stations are typically stationary intermediates by which a communication path to a radio device is established or maintained. One such type of wireless communication system is a time division multiple access (TDMA) communication system where the radio frequencies are divided into time slots for carrying the communications of the system.

When a radio is transmitting communications, there may be instances when interrupting the transmitting radio may be important. For example, a user of another radio may need to send an urgent or emergency communication using the channel occupied by the transmitting radio. One solution for interrupting a transmitting radio has been described in U.S. patent application Ser. No. 11/680,813, in which a method and system for terminating an ongoing transmission is provided. There are numerous instances, however, when only a short control or data message needs to be transmitted. In such a case, it would be desirable to not completely terminate the ongoing transmission.

BRIEF DESCRIPTION OF THE FIGURES

Various embodiments of the disclosure are now described, by way of example only, with reference to the accompanying figures.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions with respect to their corresponding respective areas of inquiry and study except where specific meaning have otherwise been set forth herein.

DETAILED DESCRIPTION OF THE DISCLOSURE

The present disclosure provides a system and method for pausing communications from a transmitting radio for a certain period of time in order to allow transmission of other messages. When a first radio determines that a message, such as a short data message or a control message, needs to be transmitted either to a second radio or the transmitting radio, the first radio determines whether there are any available communication channels (also referred to herein as forward channels) to transmit the call. If no forward channel is available, the first radio determines a period of time required to transmit the message and sends, on a reverse channel, a "request to pause" signal to the transmitting radio identifying that period of time. Upon receiving the "request to pause" signal, the transmitting radio ceases transmission on the forward channel for the specified period of time, during which time the first radio transmits the message.

Figure 1:
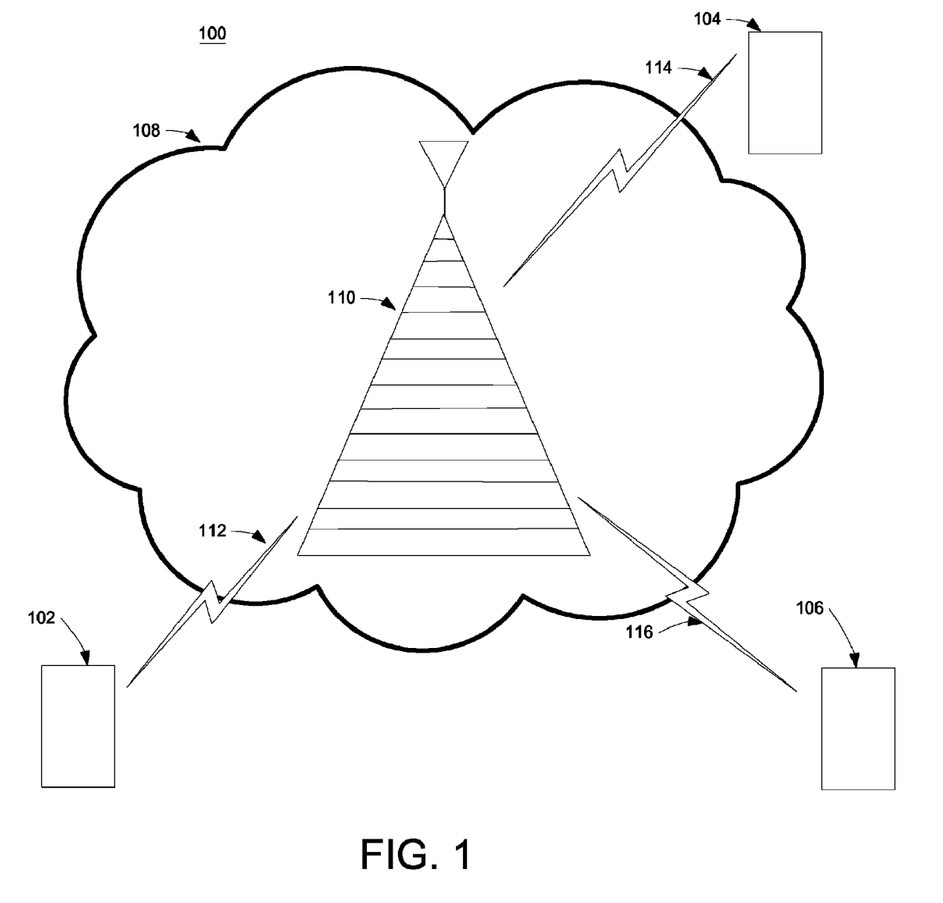
FIG. 1 shows one embodiment of a communication system according to the present disclosure.

Let us now discuss the present disclosure in greater detail by referring to the figures below. FIG. 1 illustrates an exemplary communication system 100 that may be used for implementing the present disclosure. Communication system 100 comprises communication devices 102, 104, and 106, which may be for example, portable or mobile radios, personal digital assistants, cellular telephones, video terminals, portable computers with a wireless modem, or any other wireless devices. For purposes of the following discussions, the communication devices will be referred to as "radios", but they are also referred to in the art as subscribers, mobile stations, mobile equipment, handsets, etc.

Radios 102, 104, and 106 communicate over a radio access network 108 via wireless communication resources. Of course, those of ordinary skill in the art will realize that any type of network is within the scope of the teachings herein. Thus, the radio access network 108 may comprise infrastructure such as, but not limited to, base stations (with a single base station 110 shown for clarity), base station controllers (not shown), network elements (such as a mobile switching center, home location register, visitor location register, etc.), and the like, to facilitate the communications between radios having access to the radio access network 108.

The wireless communication resources used for communication between the base station 110 and radios 102, 104, and 106 may include any type of communication resource such as, for example, radio frequency (RF) technologies, including, but not limited to TDMA; Code Division Multiple Access (CDMA), Frequency Division Multiple Access (FDMA), Orthogonal Frequency Division Multiple Access (OFDMA) and the like. Other wireless technologies, such as those now known or later to be developed and including, but not limited to, infrared, Bluetooth, electric field, electromagnetic, or electrostatic transmissions, may also offer suitable substitutes.

In the illustrated communication system 100, radios 102, 104, and 106 may communicate with each other by radio 102 establishing a wireless link or radio connection 112 with base station 110 over an available RF channel, radio 104 establishing a wireless link 114 with base station 110 over an available RF channel, and radio 106 establishing a wireless link 116 with base station 110 over an available RF channel. As is well understood in the art, base station 110 also comprises one or more repeater devices that can receive a signal from one of the radios 102, 104, or 106 over the respective link 112, 114, or 116 and retransmit the signal to one or more of the other radios. Communication from a radio 102, 104, or 106 to base station 110 are generally referred to as being inbound while communications from base station 110 to a radio 102, 104, or 106 are generally referred to as being outbound.

Of course, while one embodiment of a communication system is illustrated in FIG. 1, practitioners skilled in the art will appreciate that the system 100 may also include various other elements not shown in FIG. 1. For example, while only three radios and one base station is shown for ease of illustration, those skilled in the art will realize that in a typical system, a much larger number of radios are supported by a radio network. The system 100 may also include many more base stations than is shown in FIG. 1. Moreover, although in this embodiment, communication between radios 102, 104, and 106 are illustrated as being facilitated by base station 110, radios 102, 104, and 106 may communicate using a direct mode of operation without a base station. The teachings herein are equally applicable to direct mode operation between two radios.

Figure 2:
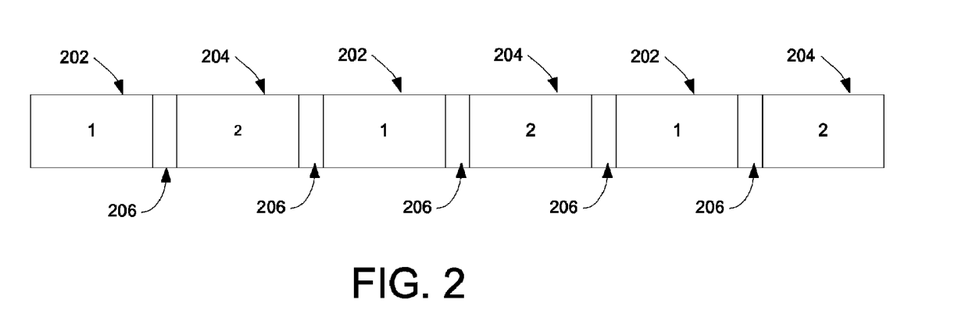
FIG. 2 shows one embodiment of a TDMA signal according to the present disclosure.

FIG. 2 illustrates one exemplary embodiment of a TDMA signal that may be used for transmitting information in accordance with the present disclosure. Generally, each frequency carrier in a TDMA signal is divided into numerous time slots or communication streams. In FIG. 2, the TDMA carrier signal is illustrated having two time slots, labeled respectively as "1" and "2", although it is should understood that a TDMA carrier signal in accordance with the present disclosure could also have any number of time slots, such as 4, 8, 16 or any other potential number of time slots. Each time slot is then further divided into discrete information packets (also referred to as "bursts") 202 and 204 configured to carry a specific amount of information. As shown in FIG. 2, sub-slots 206 may also be provided between each of the bursts. For outbound signals, the sub-slots 206 typically include a common announcement channel (CACH) signal. For inbound signals, the sub-slots 206 typically provide guard time between time slots.

In accordance with the present disclosure, the communication system 100 is also configured so that a radio may receive certain signaling and/or control information while transmitting. In one embodiment, this is accomplished by using one time slot of a TDMA carrier signal for transmitting payload (e.g., voice, data, video, or the like as a part of a call), while the other time slot may be used to transmit the signaling and/or control information. The time slot used for transmitting payload is also referred to herein as a "forward channel" while the time slot used for transmitting the signaling and control information is referred to herein as a "reverse channel." Configuring the two slots of the TDMA signal in this way allows a radio to alternately transmit call information on the forward channel and receive signaling and control information (also referred to more simply as "the reverse channel signaling") on a reverse channel. As will be shown in FIGS. 3 and 4, the reverse channel signaling may also be confined to a center portion of the slot being used for transmitting the reverse channel signaling. By confining the control information to the center of the time slot, radios that are slower to change frequencies may be used.

Figure 3:
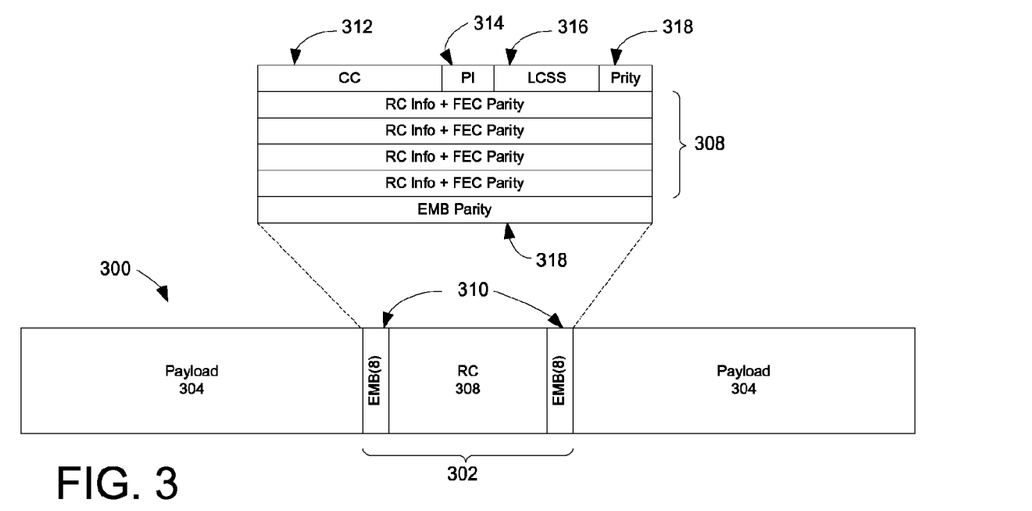
FIG. 3 shows one embodiment of reverse channel signaling on an outbound channel according to the present disclosure.
Figure 4:
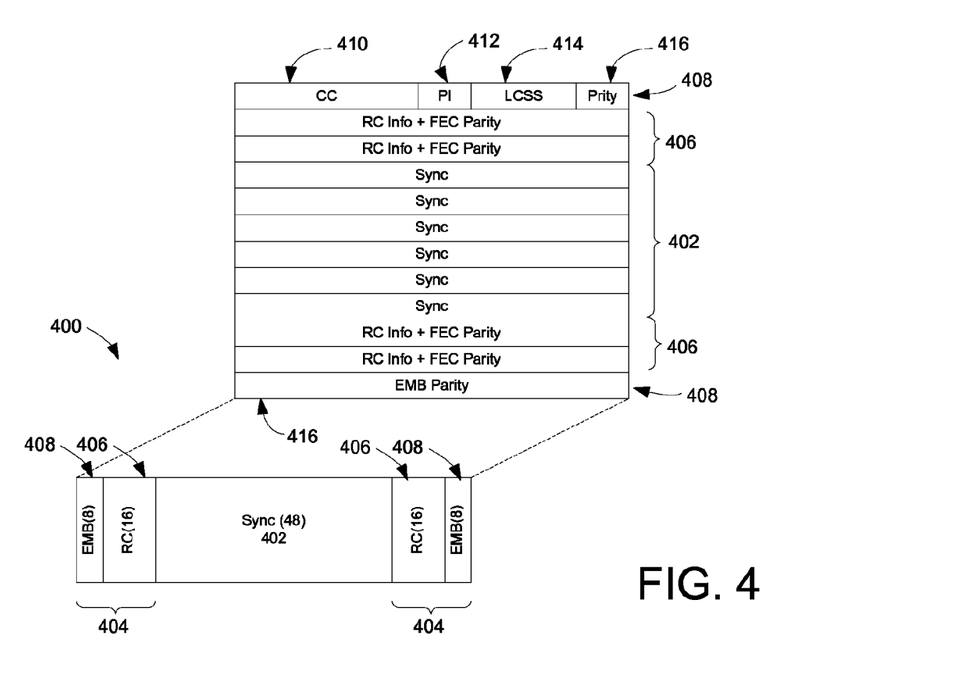
FIG. 4 shows one embodiment of reverse channel signaling on an inbound channel according to the present disclosure.

FIGS. 3 and 4 illustrate formats of reverse channel messaging structures for an outbound link (i.e., communications from a base station 110 to a radio 102 or 104) and an inbound link (i.e., communications from a radio 102 or 104 to a base station 110), respectively, in accordance with the protocols set out by European Telecommunications Standard Institute (ETSI) standard TS 102 361. In the embodiment shown in FIG. 3, the reverse channel data 302 is transmitted in the outbound direction as part of an outbound channel burst 300 having a duration of 27.5 msec. The reverse channel data 302 has a duration of 5 msec. and is centered within the outbound channel burst 300 between payload sections 304. In one embodiment, the reverse channel data 302 includes 32 bits of reverse channel signaling 308 and 16 bits of embedded (EMB) signaling 310. In one example, the 32 bits of reverse channel signaling 308 may be comprised 11 bits of reverse channel (RC) info and 21 bits of Forward Error Correction (FEC) Parity. The 16 bits of EMB signaling may be used for indicating color code (CC) 312, Privacy Indicator (PI) 314, Link Control Start Stop (LCSS) 316, EMB Parity 318. As the function and structure of the EMB signaling is well known in the art, it will not be described in any more detail herein.

On the inbound link, as illustrated in FIG. 4, the reverse channel data is transmitted as a reverse channel burst 400 having a duration of 10 msec. In this embodiment, the center of the reverse channel burst 400 carries synchronization information 402 (e.g., a 48-bit synchronization word) and the rest of the reverse channel burst 400 carries the reverse channel data 404. As in the outbound direction, the reverse channel data 404 includes 32 bits of reverse channel signaling 406 (which comprise 11 bits of RC info and 21 bits of FEC Parity) and 16 bits of embedded signaling 408. As also noted above, the 16 bits of EMB signaling may be used for indicating CC 410, PI 412, LCSS 414, and EMB Parity 416. In FIG. 4, the reverse channel data 404 is shown as having a noncontiguous 32-bit field separated by the synchronization information 402, but in other embodiments, the reverse channel data 404 may be contiguous.

The above described formatting for the outbound channel burst 300 and the reverse channel burst 400 are done so in reference to communication systems in accordance with the present ETSI standard TS 102 361. However, one skilled in the art would readily understand that the burst formats may be altered based on different standards or changes to the current ETSI standards.

The inbound reverse channel burst shown in FIG. 4 allows a radio to send reverse channel signaling on an inbound channel to another radio via a base station. However, as would be understood by one skilled in the art, the inbound channel may also be used to allow a radio to directly send reverse channel signaling to another radio when operating in a direct mode as described above.

Figure 5:
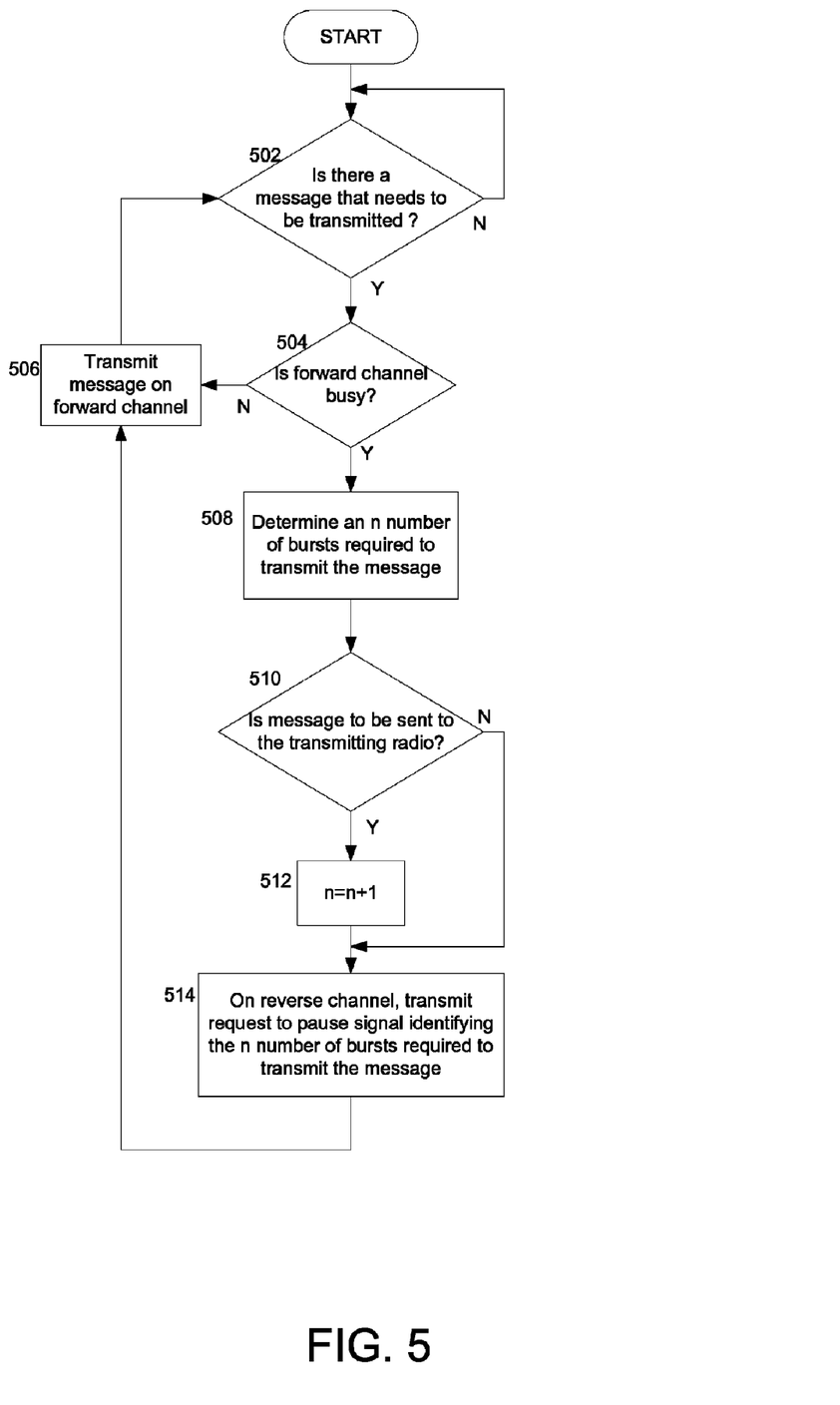
FIG. 5 shows one embodiment of a method for initiating a "request to pause" signal according to the present disclosure.
Figure 6:
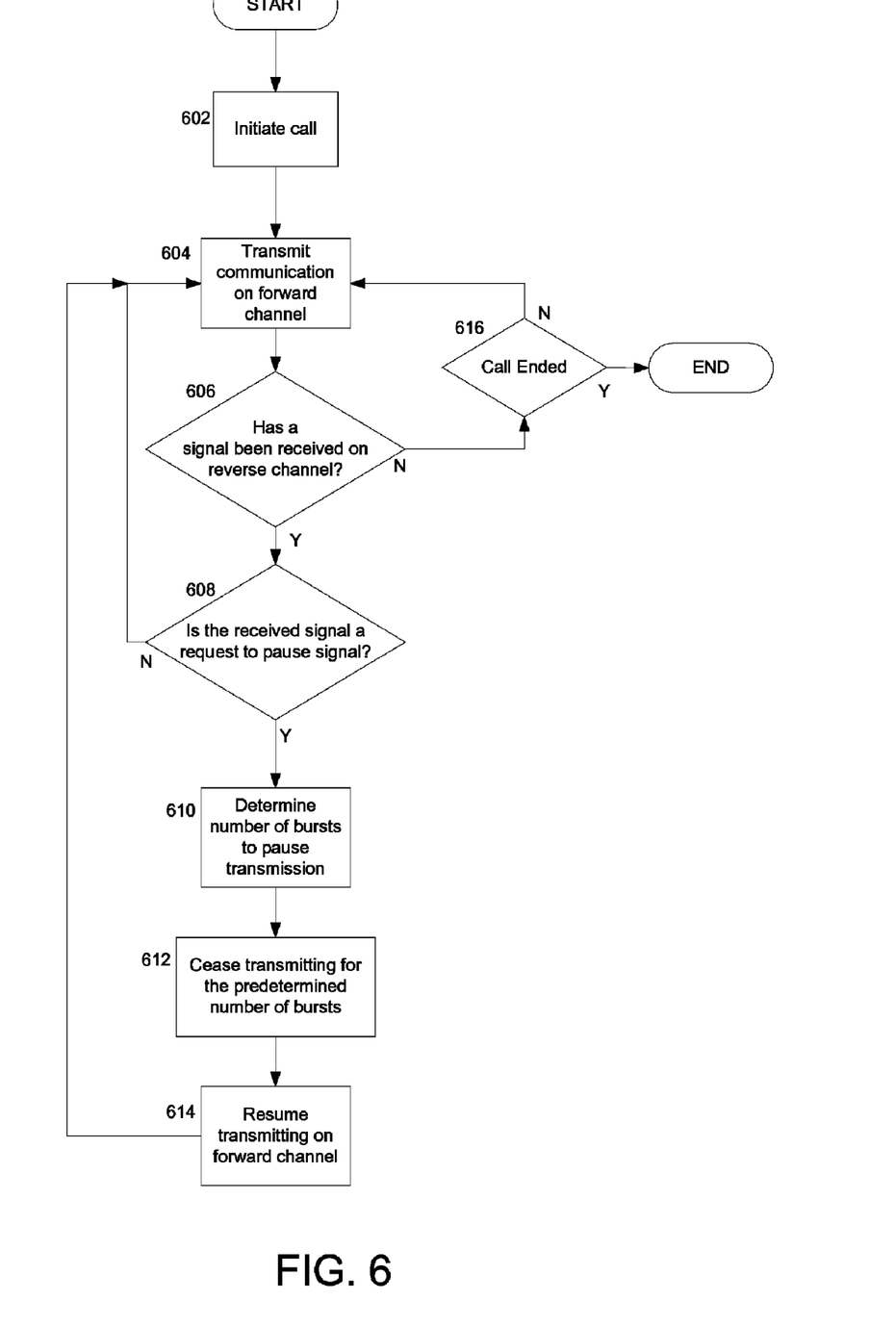
FIG. 6 shows one embodiment of a method for operating a transmitting radio upon receiving the "request to pause" signal according to the present disclosure.

FIGS. 5 and 6 illustrate an exemplary embodiment for temporarily pausing transmission of a transmitting radio in response to a pause request from a non-transmitting radio in accordance with the present disclosure. In particular, FIG. 5 illustrates one embodiment of a method for initiating a "request to pause" signal at a non-transmitting radio while FIG. 6 illustrates one embodiment of a method for receiving the "request to pause" signal at the transmitting radio.

Referring first to FIG. 5, it is determined, at a non-transmitting radio, whether there is a message that needs to be transmitted in step 502. The message may be any type of message (e.g., a short data message or control message). For example, in a TDMA system that adheres to ETSI standard TS 102 361, the message may be comprised of one or more CSBK bursts for transmitting a call alert message, an emergency alarm message, or any other type of message. The message may be initiated by a user (e.g., by pushing a button or other device on the radio) or automatically by the radio in response to a predefined event or occurrence.

If it is determined that a message is to be transmitted, it is determined whether a forward channel on which the message can be transmitted is available (i.e., is not currently being used by another radio) in step 504. In the embodiment described herein, it is assumed that the communication system includes only one forward channel and one reverse channel for inbound communications, and only one forward channel and one reverse channel for outbound communications, although it is understood that the present disclosure may also be used for communication systems using multiple forward and reverse channels for either inbound or outbound communications. If the forward channel is available, the message is transmitted on the forward channel using well-known methods in step 506, and the process returns to step 502. If the forward channel is not available, the process proceeds to step 508.

In step 508, the radio determines a number of bursts, n, that are required to transmit the entire message. Once the n number of bursts required for transmitting the message is determined, the radio also determines whether the message is to be sent to a radio that is current transmitting on the forward channel in step 510. As will be described in more detail below with regards to FIGS. 7 and 8, messages sent to a transmitting radio require an additional burst. Accordingly, if the message is to be sent to a transmitting radio, the value of n is incremented by 1 in step 512, and the process proceeds to step 514. If the message is not being sent to a transmitting radio, the process proceeds directly from step 510 to step 514.

A "request to pause" signal is transmitted by the radio to a transmitting radio on the reverse channel in step 514. In one embodiment, the "request to pause" signal is transmitted as RC info within the reverse channel signaling on the reverse channel. The "request to pause" signal is also configured to identify itself as a "request to pause" signal as well as to indicate the n number of bursts required for the message. For example, as noted above in FIGS. 3 and 4, the RC info may be comprised of 11 bits. In this instance, the first 3 bits of the RC info may be used for opcode information to identify that the RC info includes a "request to pause" signal. Thus, in one embodiment, a value of '001' may be used to indicate that the RC info includes a "request to pause" signal. Of course, other values may also be used. The remaining 5 bits may then be used to indicate the n number of bursts required for the message. Thus, in this example, the 5 bits may be used to indicate any n number of bursts between 1 (00000) and 32 (11111).

In another embodiment, the communication system 100 may also be configured to allow transmission of an interrupt signal in addition to a "request to pause" signal, where the interrupt signal may be used to stop an ongoing transmission rather than just pausing the transmitting radio. One example of a method for stopping an ongoing transmission using a reverse channel interrupt signal is described in U.S. application Ser. No. 11/680,813, which is incorporated herein by reference. In such an embodiment, one bit of the RC info may also be used to identify whether the reverse channel signaling is intended to stop transmission or to pause transmission. Thus, in one example, the first 3 bits of the RC info may be used to identify that the received signaling contains one of a "request to pause" signal or an interrupt signal (for example, a value of '001'), and the next 1 bit may be used to identify whether the received signal is an interrupt signal (e.g., a bit value of 0) or a "request to pause" signal (e.g., a bit value of 1). If the signal is a "request to pause" signal, the remaining 4 bits may be used to indicate the n number of bursts required to transmit the message between 1 (0000) and 16 (1111). Of course, the number of bits using for identifying each type of information discussed above may be increased or decreased, and the order in which the bits are used to identify the information may also be changed as a matter of design choice.

After a predetermined amount of time after transmission of the "request to pause" signal, the process proceeds to step 506 and the message is transmitted on the forward channel. As will be discussed in more detail below, the predetermined amount of time is preferably a predefined number of bursts following transmission of the "request to pause" signal when it is expected that the "request to pause" signal has been received and processed by the transmitting radio, thus causing the radio to have temporarily stopped transmitting on the forward channel.

Referring to FIG. 6, a method for receiving the "request to pause" signal at a transmitting radio is described. A call is initiated by a radio in step 602 and the radio begins transmitting on the inbound forward channel in step 604. As described above, the transmitting radio also continually listens to the outbound reverse channel while transmitting on the inbound forward channel. In step 606, it is determined whether any signal (i.e., reverse channel signaling) has been received on the reverse channel. If a signal has not been received on the reverse channel, the process returns to step 604 and the transmitting radio continues to transmit the call on the forward channel as normal so long as the call has not ended (see step 616). If a signal has been received on the reverse channel, it is determined, by decoding the RC info, whether the received signal is a "request to pause" signal requesting the transmitting radio to be paused in step 608. If the received signal is not such a "request to pause" signal, the process returns to step 604. If the received signal is such a "request to pause" signal, the transmitting radio determines the number of bursts for which to pause transmission in step 610. In one embodiment, this is accomplished by identifying the n number of bursts required for the message as indicated in the decoded RC info.

In step 612, the transmitting radio stops transmitting for the next n number of bursts following receipt of the "request to pause" signal. Once the n number of bursts has elapsed, the transmitting radio resumes transmitting on the forward channel in step 614, and the process returns to step 604.

Figure 7:
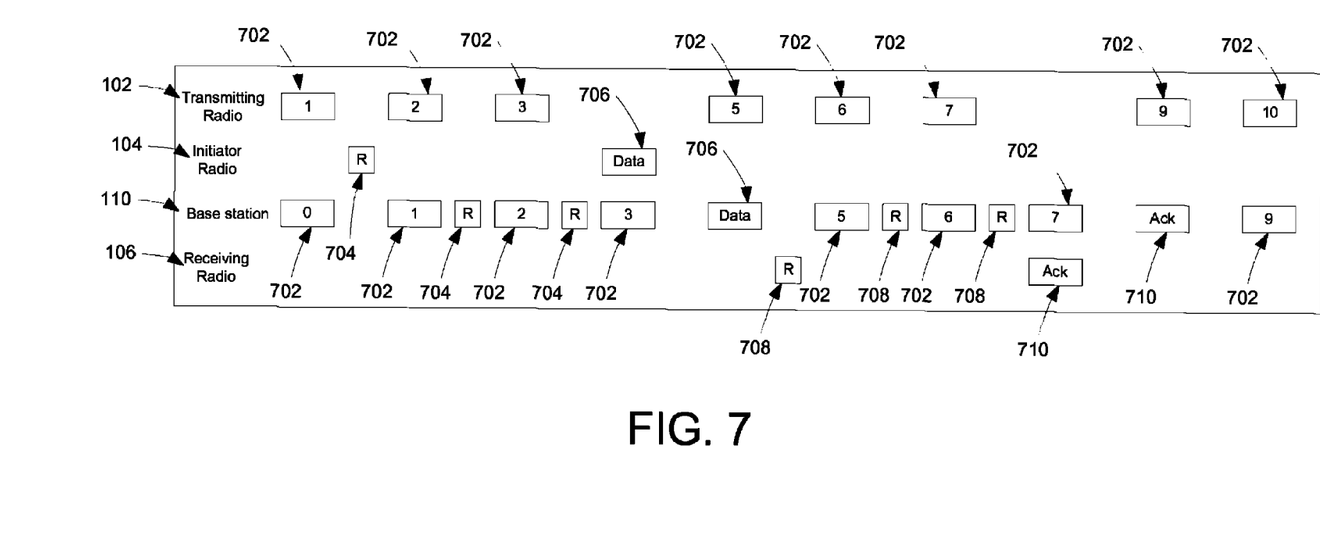
FIG. 7 shows one exemplary embodiment of the present disclosure in which a transmitting radio is paused to allow a message to be transmitted from a first non-transmitting radio to a second non-transmitting radio.
Figure 8:
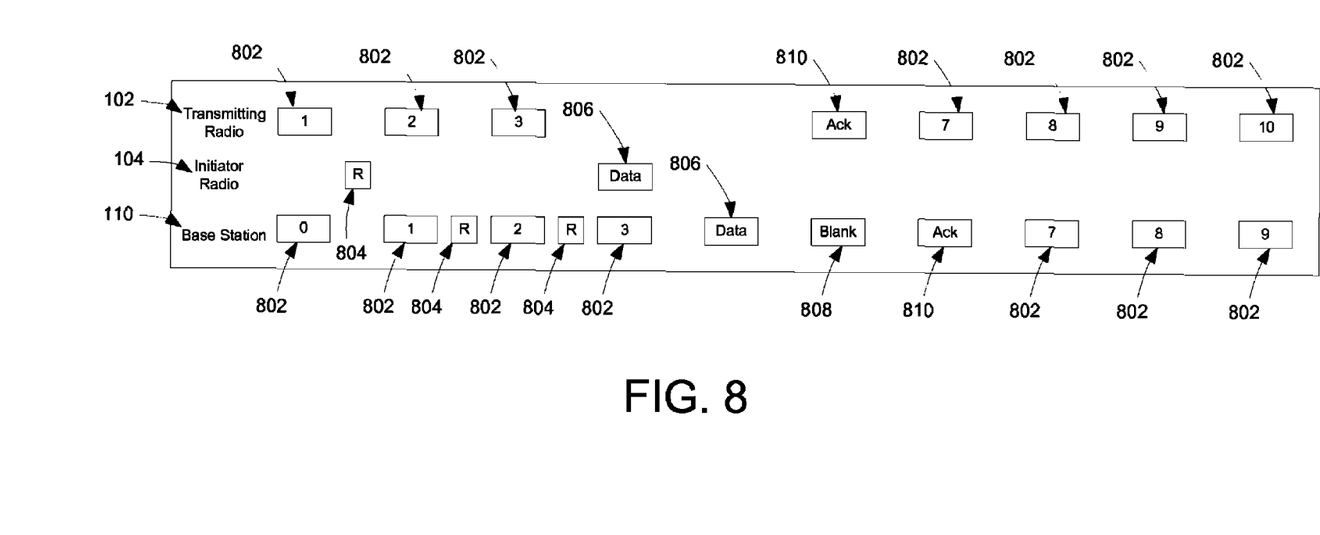
FIG. 8 shows one exemplary embodiment of the present disclosure in which a transmitting radio is paused to allow a message to be transmitted from a non-transmitting radio to the transmitting radio.

FIGS. 7 and 8 illustrate two exemplary embodiments of communications between radios utilizing the present disclosure. Referring first to FIG. 7, an embodiment is described in which a radio (also referred to as an initiating radio) needs to send a message to a radio other than the radio that is currently transmitting (referred to as a receiving radio). As an example, let us assume that in the communication system 100 of FIG. 1, radio 102 is the transmitting radio, radio 104 is the initiating radio, and radio 106 is the receiving radio (i.e., the radio that is to receive the message). The various blocks shown in FIG. 7 indicate transmission of the various bursts and signals from the respective radios. Thus, the transmitting radio 102 is illustrated transmitting a series of TDMA bursts 702 on an inbound forward channel, where each of the bursts corresponds to a portion of the transmitted communication. Each burst 702 is received by the base station 110 and is retransmitted during a subsequent burst period to the other radios using the outbound forward channel. Thus, as shown in FIG. 7, burst "1" is transmitted from the transmitting radio 102, received by the base station 110, and retransmitted during the next available burst period on the outbound forward channel. The same process is performed for burst "2", "3" and so on.

As a result, TDMA bursts 702 are typically transmitted to other radios in the system one burst period after the TDMA burst 702 has been transmitted from the transmitting radio 102.

Once the initiating radio 104 has determined that a message is to be sent to the receiving radio 106, a "request to pause" signal 704 requesting the transmitting radio 102 to be paused is formed and transmitted by the initiating radio 104 on the inbound reverse channel, using the method described above in FIG. 5. For purposes of this example, it is assumed that the "request to pause" signal 704 requests that the transmitting radio 102 be paused for only one burst.

The "request to pause" signal 704 is received by the base station 110 and retransmitted on the outbound reverse channel. In the embodiment shown in FIG. 7, the base station retransmits the "request to pause" signal 704 two times in order to better ensure that the "request to pause" signal 704 is received by the transmitting radio 102. However, it should be understood that the base station 110 may only retransmit the "request to pause" signal 704 once, or may retransmit the "request to pause" signal 704 more than two times.

Upon receiving the "request to pause" signal 704, the transmitting radio 102 pauses transmission on the forward channel for the requisite number of bursts. Thus, since the "request to pause" signal 704 in this example included an n value of 1, the transmitting radio 102 ceases transmission for one burst period following burst "3." During the time when the transmitting radio 102 has ceased transmitting, the initiating radio 104 transmits a message 706 on the inbound forward channel. In one embodiment, the initiating radio 104 may identify the time when the transmitting radio 102 has ceased transmitting by determining when a predetermined number of bursts following transmission of the "request to pause" signal have elapsed, where the predetermined number of bursts corresponds to the number of bursts required for the "request to pause" signal to have been received and processed by the transmitting radio 102. For example, in the embodiment illustrated in FIG. 7, the initiating radio 104 may be configured to transmit the message three bursts after transmission of the "request to pause" signal.

The message 706 transmitted by the initiating radio 104 is received by the base station 110 and retransmitted during the next available burst period on the outbound forward channel. As noted above, the message 706 may be a data message or a control message such as a CSBK burst for transmitting a call alert message, an emergency alarm message, or another type of control message.

As further shown in FIG. 7, in one embodiment, the receiving radio 106 may also be required to send an acknowledgement of receipt of the message 706 back to the initiating radio 104. If an acknowledgement is required, the receiving radio 106 formats and transmits a "request to pause" signal 708 on the inbound reverse channel indicating the number of bursts required to transmit the acknowledgement message. The "request to pause" signal 708 is retransmitted by the base station 110 on the outbound reverse channel. Again, although the base station 110 is illustrated as repeating the "request to pause" signal 708 two times, the base station 110 may only retransmit the "request to pause" signal 708 once or more than two times.

Upon receiving the "request to pause" signal 708, the transmitting radio 102 again pauses transmission on the forward channel for the requisite number of bursts. Thus, assuming again, for purposes of this example, that the "request to pause" signal 708 indicates that a single burst is required for the acknowledgement message, the transmitting radio 102 ceases transmission for a single burst upon receiving the "request to pause" signal 708 (i.e., it does not transmit for one burst period following burst "7"). During the time when the transmitting radio 102 has ceased transmitting, the receiving radio 106 transmits an acknowledgement message 710 on the inbound forward channel. The acknowledgement message 710 is received by the base station 110 and retransmitted on the outbound forward channel to the initiating radio 104.

Referring now to FIG. 8, an embodiment is described in which the initiating radio needs to send a message to the transmitting radio. Again, for purposes of this example, it is assumed that radio 102 is the transmitting radio and radio 104 is the initiating radio. As in FIG. 7, the transmitting radio 102 is illustrated transmitting a series of TDMA bursts 802 on the inbound forward channel. Each burst 802 is received by the base station 110 and retransmitted to the other radios on an outbound forward channel.

Once the initiating radio 104 has determined that a message is to be sent to the transmitting radio 102, a "request to pause" signal 804 requesting the transmitting radio 102 to be paused is formed and transmitted by the initiating radio 104 on the inbound reverse channel, using the method described above in FIG. 5. For purposes of this example, it is assumed that the "request to pause" signal 804 requires only a single burst. However, as discussed above, since the message is being sent to a transmitting radio, the value of n is incremented by 1. Thus, in this example the value of n is 2.

The "request to pause" signal 804 is received by the base station 110 and retransmitted on the outbound reverse channel. As in FIG. 7, although the base station 110 is shown retransmitting the "request to pause" signal 804 two times, the base station 110 may only retransmit the "request to pause" signal 804 once, or may retransmit the "request to pause" signal 804 more than two times.

Upon receiving the "request to pause" signal 804, the transmitting radio 102 ceases transmission on the forward channel for the requested number of bursts. Thus, since the "request to pause" signal 804 in this example included an n value of 2, the transmitting radio 102 does not transmit for a period of two bursts following burst "3." The initiating radio 104 transmits a message 806 on the inbound forward channel during the time when a fourth burst would have been expected from the transmitting radio 102. The message 806 is received by the base station 110 and retransmitted on the outbound forward channel to the transmitting radio 102.

Thus, as can be seen from FIG. 8, the transmitting radio 102 is paused for one extra burst period beyond what is required to send the message so that the transmitting radio 102 is not actively transmitting when the message is being retransmitted by the base station 110. This allows the transmitting radio 102 to be capable of receiving the message 806 when it is being retransmitted by the base station 110. Of course, it should be understood that if the initiating radio 104 is operating in direct mode to transmit a message directly to a transmitting radio 102 rather than via a base station 110, there may be no need for the extra pause burst period.

Additionally, since no radio is transmitting on the inbound forward channel during the last burst period in which the transmitting radio 102 is paused (i.e., the time during which the message 806 is being retransmitted by the base station 110), the base station 110 may be configured to either not retransmit any information of that burst period, or to transmit a blank burst 808 on the outbound forward channel at the appropriate time to indicate that no information or message is being transmitted or that the burst is being reserved.

As above, the transmitting radio 102 may also be required to send an acknowledgement of receipt of the message 806 back to the initiating radio 104. In this embodiment, if an acknowledgement is required, the transmitting radio 102 simply transmits an acknowledgement message 810 on the inbound forward channel, which is then retransmitted by the base station 110 on the outbound forward channel.

By means of the aforementioned disclosure, a system and method is provided in which a transmitting radio may be paused for a certain period of time in order to allow for transmission of a message (e.g., a short data message or control message) by other radios. This ensures that certain messages, such as emergency or high priority messages, can be transmitted even if all the radio channels are currently in use.

Further advantages and modifications of the above described system and method will readily occur to those skilled in the art. For example, although one exemplary embodiment has been described using a TDMA system that adheres to the ETSI standard TS 102 361, the present disclosure may also be applicable to communication systems using other channel access schemes or other air interface protocols. The configuration of the "request to pause" signal may also be altered. For example, the number of bit values used to identify the number of bursts required for the message may be increased or decreased. In this way, the maximum size of the message that can be transmitted using the present disclosure may also be altered.

Additionally, if a communication system is configured such that the "request to pause" signal is capable of identifying the recipient of the message that is to be subsequently transmitted, an initiating radio need not necessarily be configured to increase the pause time when the message is being sent to a transmitting radio. Instead, the transmitting radio may itself be configured to determine that it will be the recipient of the coming message and adjust the amount of time for which it should be paused accordingly.

The disclosure, in its broader aspects, is therefore not limited to the specific details, representative system and methods, and illustrative examples shown and described above. For example, the number of burst that the initiating radio requests the transmitting radio to pause could include all the burst required for the session (i.e., the actual message and its corresponding response/acknowledgement). Various modifications and variations can be made to the above specification without departing from the scope or spirit of the present disclosure, and it is intended that the present disclosure cover all such modifications and variations provided they come within the scope of the following claims and their equivalents.

What is claimed is:

1. A method for pausing a transmitting mobile or portable radio in a communication system comprising:
   transmitting, by the transmitting mobile or portable radio, a communication on a forward channel of a communication system while listening to a reverse channel wherein the forward channel comprises a first timeslot of a TDMA communication, and the reverse channel comprises a portion of a second timeslot of the TDMA communication;
   receiving, at the transmitting mobile or portable radio, from a second mobile or portable radio operating in a direct mode, or from a base station when the second mobile or portable radio is not operating in the direct mode, on the reverse channel, a request to pause signal;
   ceasing transmission of the communication on the forward channel by the mobile or portable radio for a period of time in response to the request to pause signal; and
   automatically resuming transmission of the communication on the forward channel by the mobile or portable radio after the period of time has elapsed;
   wherein the reverse channel is used for the second mobile or portable radio to send reverse channel signaling on an inbound channel to another radio via a base station and is also used to allow the second mobile or portable radio to directly send reverse channel signaling to another radio when operating in a direct mode; and
   wherein the period of time is based on whether or not the second radio is operating in the direct mode.

2. The method of claim 1 further including receiving a message on the forward channel during the period of time that transmission of the communication on the forward channel has ceased.

3. The method of claim 1 wherein the reverse channel comprises a center portion of the second timeslot.

4. The method of claim 1 further including determining the period of time to cease transmission based on information provided in the request to pause signal.

5. The method of claim 1 wherein ceasing transmission of the communication on the forward channel for a period of time in response to the received reverse channel signaling includes ceasing transmission of the communication on the forward channel for a number of TDMA bursts in response to the received reverse channel signaling.

6. The method of claim 5 further including determining the number of TDMA bursts to cease transmission based on information provided in the request to pause signal.

7. A method for pausing a transmitting a mobile or portable radio in a communication system comprising:
   a first mobile or portable radio performing:
   determining that a message is to be sent to a second mobile or portable radio;
   identifying that a forward channel used for transmitting communications in the communication system is busy;
   determining a period of time required to transmit the message;
   transmitting a request to pause signal on a reverse channel, the request to pause signal including information indicating the period of time required to transmit the message; transmitting the message on the reverse channel;
   wherein the forward channel comprises a first timeslot of a TDMA communication, and the reverse channel comprises a portion of a second timeslot of the TDMA communication;
   wherein the reverse channel is used for the first mobile or portable radio to send reverse channel signaling on an inbound channel to second radio via a base station and is also used for the first mobile or portable radio to directly send reverse channel signaling to the second radio when operating in a direct mode; and wherein the period of time is based on whether or not that the second radio is operating in the direct mode.

8. The method of claim 7 wherein the reverse channel comprises a center portion of the second timeslot.

9. The method of claim 7 wherein transmitting the message includes transmitting the message a predetermined amount of time after transmitting the request to pause signal.

10. The method of claim 7 wherein the message is transmitted either directly from the first radio to the second radio or through at lease one base station.

11. The method of claim 7 wherein the second radio is the transmitting radio.

12. The method of claim 11 wherein determining the period of time includes determining that the second radio is the transmitting radio; and increasing the period of time by a predetermined amount upon determining that the second radio is the transmitting radio.

13. A communication system comprising:
a plurality of mobile or portable radios, the plurality of radios including:
- a transmitting mobile or portable radio that transmits a communication on a forward channel of the communication system while listening to a reverse channel, wherein the forward channel comprises a first timeslot of a TDMA communication, and the reverse channel comprises a portion of a second timeslot of the TDMA communication; and
- a first mobile or portable radio configured to determine that a message is to be sent to the transmitting mobile or portable radio; identify that the forward channel being used by the transmitting mobile or portable radio is busy; determine a period of time required to transmit the message; and transmit a request to pause signal on the reverse channel, the request to pause signal including information indicating the period of time required to transmit the message;

wherein the first mobile or portable radio transmits the request on the reverse channel to a base station and also transmits the request on the reverse channel directly to the transmitting mobile or portable radio when operating in a direct mode; and wherein the period of time is based on whether or not that the second radio is operating in the direct mode;

wherein upon receiving the request to pause signal on the reverse channel from the first mobile or portable radio, the transmitting mobile or portable radio ceases transmission of the communication on the forward channel for the period of time indicated in the request to pause signal.

14. The system of claim 13 wherein the second mobile or portable radio is the transmitting radio.

15. The method of claim 14 wherein the second radio is configured to, upon receiving the message, transmit an acknowledgment message to the first radio, and wherein the second radio does not transmit a request to pause message prior to transmitting the acknowledgement message.

16. The system of claim 13 wherein the first radio is further configured to transmit the message during the period of time when transmission of the communication on the forward channel is ceased.

17. The system of claim 16 wherein the second radio is configured to, upon receiving the message, transmit an acknowledgment message to the first radio.

18. The system of claim 17 wherein, prior to transmitting the acknowledgment message, the second radio transmits a request to pause signal indicating a period of time required to transmit the acknowledgement signal.

19. The system of claim 13 further comprising a base station for wireless communication with the plurality of mobile or portable radios and to retransmit communications received on an inbound channel over an outbound channel.

20. The system of claim 19 wherein the base station is configured to retransmit the request to pause signal multiple times.

* * * * *

UNITED STATES PATENT AND TRADEMARK OFFICE
CERTIFICATE OF CORRECTION

PATENT NO. : 8,259,690 B2  
APPLICATION NO. : 11/753004  
DATED : September 4, 2012  
INVENTOR(S) : Wiatrowski et al.

Page 1 of 1

It is certified that error appears in the above-identified patent and that said Letters Patent is hereby corrected as shown below:

In Column 10, Line 60, in Claim 10, delete "at lease" and insert -- at least --, therefor.

Signed and Sealed this  
Fifth Day of February, 2013

Teresa Stanek Rea  
*Acting Director of the United States Patent and Trademark Office*